(12) United States Patent
Tomchek et al.

(10) Patent No.: US 8,271,392 B2
(45) Date of Patent: *Sep. 18, 2012

(54) METHODS AND SYSTEMS FOR MANAGING MERCHANT SCREENING

(75) Inventors: Brad Michael Tomchek, St. Charles, MO (US); Jill E. Chong, Ballwin, MO (US); Suman Rausaria, Ballwin, MO (US); Cathrine Lee Bone, St. Louis, MO (US); Linda L. McCorkell, St. Peters, MO (US); Shoon Ping Wong, St. Charles, MO (US); Janet Smith, Des Peres, MO (US)

(73) Assignee: MasterCard International Incorporated, Purchase, NY (US)

( * ) Notice: Subject to any disclaimer, the term of this patent is extended or adjusted under 35 U.S.C. 154(b) by 503 days.

This patent is subject to a terminal disclaimer.

(21) Appl. No.: 12/416,728

(22) Filed: Apr. 1, 2009

(65) Prior Publication Data

US 2009/0254463 A1 Oct. 8, 2009

Related U.S. Application Data

(60) Provisional application No. 61/042,569, filed on Apr. 4, 2008.

(51) Int. Cl.
*G06Q 20/00* (2012.01)
(52) U.S. Cl. ........................................ 705/64
(58) Field of Classification Search ............... 705/64
See application file for complete search history.

(56) References Cited

U.S. PATENT DOCUMENTS

| | | | |
|---|---|---|---|
| 5,590,038 A | 12/1996 | Pitroda | |
| 5,870,473 A * | 2/1999 | Boesch et al. ............... 705/78 |
| 5,956,695 A | 9/1999 | Carrithers et al. | |
| 6,169,974 B1 | 1/2001 | Baumgartner et al. | |
| 6,332,134 B1 | 12/2001 | Foster | |
| 6,915,277 B1 | 7/2005 | Manchester et al. | |
| 7,020,633 B2 | 3/2006 | Strayer et al. | |
| 7,043,451 B2 | 5/2006 | Strayer et al. | |
| 7,069,244 B2 | 6/2006 | Strayer et al. | |
| 7,104,443 B1 | 9/2006 | Paul et al. | |
| 7,119,659 B2 | 10/2006 | Bonalle et al. | |

(Continued)

OTHER PUBLICATIONS

International Search Report and The Written Opinion of the International Searching Authority, PCT/US09/39344 dated May 26, 2009 (7 pages).

*Primary Examiner* — James A Reagan
*Assistant Examiner* — Calvin Cheung
(74) *Attorney, Agent, or Firm* — Armstrong Teasdale LLP

(57) ABSTRACT

A method and system for processing a financial transaction using a payment card through a third-party interchange network is provided. The financial transaction is initiated by a cardholder at a merchant location. The method includes storing a list of private label participating merchants, receiving an authorization request for the transaction involving the payment card wherein the authorization request includes a merchant location identifier for the merchant location where the transaction occurred, performing a merchant screening process on the transaction including validating the transaction as originating at a private label participating merchant location, manipulating at the interchange network the authorization request to include a private label identifier when the transaction is determined to have originated at one of the participating merchants, and transmitting the manipulated authorization request with the private label identifier to an issuer of the payment card for processing as a private label transaction.

35 Claims, 8 Drawing Sheets

U.S. PATENT DOCUMENTS

| | | | |
|---|---|---|---|
| 7,275,685 B2 | 10/2007 | Gray et al. | |
| 7,360,693 B1 | 4/2008 | Sullivan | |
| 7,406,442 B1 | 7/2008 | Kottmeier, Jr. et al. | |
| 7,424,455 B2 | 9/2008 | Kellogg et al. | |
| 7,496,524 B2 | 2/2009 | Voltmer et al. | |
| 7,500,602 B2 | 3/2009 | Gray | |
| 7,575,177 B2 | 8/2009 | Killian et al. | |
| 7,610,233 B1* | 10/2009 | Leong et al. | 705/37 |
| 7,752,134 B2 | 7/2010 | Spear | |
| 7,774,274 B2 | 8/2010 | Jones et al. | |
| 7,783,566 B2* | 8/2010 | Armes et al. | 705/40 |
| 7,848,977 B2 | 12/2010 | McCarthy et al. | |
| 2002/0059146 A1 | 5/2002 | Keech | |
| 2002/0138428 A1 | 9/2002 | Spear | |
| 2002/0156689 A1* | 10/2002 | Spalding | 705/26 |
| 2003/0088462 A1 | 5/2003 | Carrithers et al. | |
| 2003/0204470 A1 | 10/2003 | Manchester et al. | |
| 2004/0030645 A1* | 2/2004 | Monaghan | 705/40 |
| 2004/0054622 A1 | 3/2004 | Strayer et al. | |
| 2004/0107125 A1* | 6/2004 | Guheen et al. | 705/7 |
| 2004/0117300 A1 | 6/2004 | Jones et al. | |
| 2004/0186773 A1* | 9/2004 | George et al. | 705/14 |
| 2004/0236682 A1 | 11/2004 | Strayer et al. | |
| 2004/0249749 A1 | 12/2004 | Strayer et al. | |
| 2005/0027543 A1* | 2/2005 | Labrou et al. | 705/1 |
| 2005/0035192 A1 | 2/2005 | Bonalle et al. | |
| 2005/0234817 A1 | 10/2005 | VanFleet et al. | |
| 2005/0246278 A1 | 11/2005 | Gerber et al. | |
| 2006/0116954 A1 | 6/2006 | Strayer et al. | |
| 2006/0116955 A1 | 6/2006 | Strayer et al. | |
| 2006/0180660 A1 | 8/2006 | Gray | |
| 2006/0208065 A1* | 9/2006 | Mendelovich et al. | 235/380 |
| 2006/0229974 A1 | 10/2006 | Keithley et al. | |
| 2006/0253390 A1 | 11/2006 | McCarthy et al. | |
| 2007/0012759 A1 | 1/2007 | Allarea et al. | |
| 2007/0045407 A1 | 3/2007 | Paul et al. | |
| 2007/0051797 A1 | 3/2007 | Randolph-Wall et al. | |
| 2008/0005018 A1 | 1/2008 | Powell | |
| 2008/0040610 A1 | 2/2008 | Fergusson | |
| 2008/0048025 A1 | 2/2008 | Fitzgerald et al. | |
| 2008/0249938 A1* | 10/2008 | Drake-Stoker | 705/44 |
| 2008/0288396 A1 | 11/2008 | Siggers et al. | |
| 2009/0006262 A1 | 1/2009 | Brown et al. | |
| 2009/0076956 A1 | 3/2009 | Bishop et al. | |
| 2009/0090783 A1 | 4/2009 | Killian et al. | |
| 2009/0094123 A1 | 4/2009 | Killian et al. | |
| 2009/0094125 A1 | 4/2009 | Killian et al. | |
| 2009/0094126 A1 | 4/2009 | Killian et al. | |
| 2009/0164380 A1* | 6/2009 | Brown | 705/65 |
| 2010/0030687 A1* | 2/2010 | Panthaki et al. | 705/43 |
| 2010/0049651 A1 | 2/2010 | Lang et al. | |
| 2010/0153199 A1 | 6/2010 | Ahmad | |
| 2010/0211444 A1 | 8/2010 | Spear | |
| 2011/0029396 A1 | 2/2011 | Sobek | |
| 2011/0137799 A1* | 6/2011 | Persaud et al. | 705/44 |

\* cited by examiner

METHODS AND SYSTEMS FOR MANAGING MERCHANT SCREENING

CROSS REFERENCE TO RELATED APPLICATIONS

This application claims the priority of Provisional Patent Application Ser. No. 61/042,569, filed Apr. 4, 2008, which is hereby incorporated by reference in its entirety.

BACKGROUND OF THE INVENTION

This invention relates generally to processing transactions associated with financial transaction card accounts and, more particularly, to network-based methods and systems for managing merchant screening during financial transaction card account processing.

At least some known merchants accept payment for goods and services using more than one type of financial transaction card systems. One type may be a multi-party transaction system where transactions are processed through a multi-party transaction system interchange. Another type may be a private label transaction system where merchants are directly communicatively coupled to a private label issuer for transaction processing. For example, some merchants accept Visa®, MasterCard®, Discover®, and/or American Express® financial transaction cards. Some merchants also accept a private label financial transaction card, such as a Macy's®, Home Depot®, or other retail merchant card. Generally private label transaction systems are closed to transaction data being transmitted on the private label transaction systems that is not associated with a private label transaction. As such, less identification of the merchants and transaction information is required.

To facilitate processing, issuers may find switching their private label portfolio transactions through the multi-party transaction system interchange improves response times and/or cost benefits. Currently, merchants are typically directly connected to the issuers that manage their private label programs and transactions are processed in a closed-loop manner. Because of the closed nature of their current private label processing environment, issuers know that the transactions they receive come from a participating merchant. However, with a multi-party transaction system interchange, issuers need to ensure that a private label transaction is originating at a participating merchant location. Verifying the participating merchant location by the issuer may also be labor intensive and prone to error.

BRIEF DESCRIPTION OF THE INVENTION

In one embodiment, a computer-based method for processing a financial transaction using a payment card through a third-party interchange network is provided. The financial transaction is initiated by a cardholder at a merchant location. The payment card is issued by an issuer to the cardholders The method includes storing within a database a list of private label participating merchants including a merchant location identifier identifying each location of each private label participating merchant included on the list, receiving at the interchange network an authorization request for the transaction involving the payment card wherein the authorization request includes a data field for storing a merchant location identifier for the merchant location where the transaction occurred, performing a merchant screening process on the transaction including validating the transaction as originating at a private label participating merchant location by comparing the received merchant location identifier to the list of private label participating merchants stored within the database, manipulating at the interchange network the authorization request to include a private label identifier when the transaction is determined to have originated at one of the participating merchants, and transmitting the manipulated authorization request with the private label identifier to the issuer for processing as a private label transaction.

In another embodiment, a network-based system for processing a financial transaction using a payment card through a third-party interchange network is provided. The financial transaction is initiated by a cardholder at a merchant location. The payment card is issued by an issuer to the cardholders The system includes an acquirer computer system, an issuer computer system, a database, and a server system configured to be coupled to the acquirer computer system, the issuer computer system, and the database. The server system is associated with the interchange network. The server system is configured to store within the database a list of private label participating merchants including a merchant location identifier identifying each location of each private label participating merchant included on the list, receive from the acquirer computer system an authorization request for the transaction involving the payment card wherein the authorization request includes a data field for storing a merchant location identifier for the merchant location where the transaction occurred, perform a merchant screening process on the transaction including validating the transaction as originating at a private label participating merchant location by comparing the received merchant location identifier to the list of private label participating merchants stored within the database, manipulate the authorization request to include a private label identifier when the transaction is determined to have originated at one of the participating merchants, and transmit the manipulated authorization request with the private label identifier to the issuer computer system for processing as a private label transaction.

In another embodiment, a computer for processing a financial transaction initiated by a cardholder at a merchant location using a payment card is provided. The computer is associated with a third-party interchange network. The payment card is issued by an issuer to a cardholders The computer having a memory is programmed to store within the memory a list of private label participating merchants including a merchant location identifier identifying each location of each private label participating merchant included on the list, receive an authorization request for the transaction involving the payment card wherein the authorization request includes a data field for storing a merchant location identifier for the merchant location where the transaction occurred, perform a merchant screening process on the transaction including validating the transaction as originating at a private label participating merchant location by comparing the received merchant location identifier to the list of private label participating merchants stored within the memory, manipulate the authorization request to include a private label identifier when the transaction is determined to have originated at one of the participating merchants, and transmit the manipulated authorization request with the private label identifier to the issuer for processing as a private label transaction.

In another embodiment, a computer program embodied on a computer readable medium for processing a financial transaction using a payment card and an interchange computer associated with a third-party interchange network is provided. The financial transaction is initiated by a cardholder at a merchant location. The payment card is issued by an issuer to the cardholders The program is executed by the interchange computer and comprises at least one code segment that stores within a database a list of private label participating merchants including a merchant location identifier identifying each location of each private label participating merchant included on the list, receives an authorization request for the transaction involving the payment card wherein the authorization request includes a data field for storing a merchant location identifier for the merchant location where the transaction occurred, performs a merchant screening process on the transaction including validating the transaction as originating at a private label participating merchant location by comparing the received merchant location identifier to the list of private label participating merchants stored within the database, manipulates the authorization request to include a private label identifier when the transaction is determined to have originated at one of the participating merchants, and transmits the manipulated authorization request with the private label identifier to the issuer for processing as a private label transaction.

In another embodiment, a method of processing a merchant matching request from a private label payment card issuer is provided. The private label payment card issuer is communicatively coupled to a multi-party payment card interchange. The method includes transmitting a list of private label participating merchants by the private label payment card issuer to the multi-party payment card interchange wherein the list includes physical location information relating to the private label merchants listed, receiving cardholder-initiated transaction data at the multi-party payment card interchange from a merchant, determining from the transaction data whether the transaction is a private label transaction, and comparing the merchant associated with the determined private label transaction to the list of private label participating merchants to validate that the merchant submitting the corresponding transaction data is a participating merchant location. The method further includes transmitting an authorization request to the associated private label card issuer if the transaction originates at a participating merchant location, and transmitting a declining message if the transaction originates at a non-participating merchant location. The method also includes processing transaction data, determining whether the transaction is a private label transaction based on the processed transaction data, and transmitting the transaction data to the issuer for business-as-usual processing if the transaction is determined to be not a private label transaction.

In another embodiment, a network-based system for managing merchant identification in a cardholder-initiated financial transaction with a private label merchant using a private label merchant controlled input device is provided. The cardholder uses a private label payment card issued to the cardholder by a private label issuer bank. The system includes a database for storing information including a list of private label participating merchants and physical location information relating to the private label merchants listed, and a server system communicatively coupled to the database and the private label merchant controlled input device. The server system is associated with a third party card network. The server is configured to receive transaction data from a merchant, determine from the transaction data whether the transaction is a private label transaction, validate the merchant submitting the transaction data is a participating merchant location by comparing the merchant associated with the determined private label transaction to the list of private label participating merchants stored within the database, transmit an authorization request to the associated private label card issuer if the transaction originates at a participating merchant location, and transmit a declining message if the transaction originates at a non-participating merchant location.

In still another embodiment, a computer program embodied on a computer readable medium for processing a merchant matching request from a private label payment card issuer is provided. The private label payment card issuer is communicatively coupled to a multi-party payment card interchange that includes access to a data warehouse. The program comprising at least one code segment that stores information within the data warehouse including a list of private label participating merchants and physical locations relating to the private label merchants listed, receives cardholder-initiated transaction data at the multi-party payment card interchange from a merchant, determines from the transaction data whether the transaction is a private label transaction, validates the merchant submitting the corresponding transaction data is a participating merchant location by comparing the merchant associated with the determined private label transaction to the list of private label participating merchants, transmits an authorization request to the associated private label card issuer if the transaction originates at a participating merchant location, and transmits a declining message if the transaction originates at a non-participating merchant location.

DETAILED DESCRIPTION OF THE INVENTION

Figure 1:
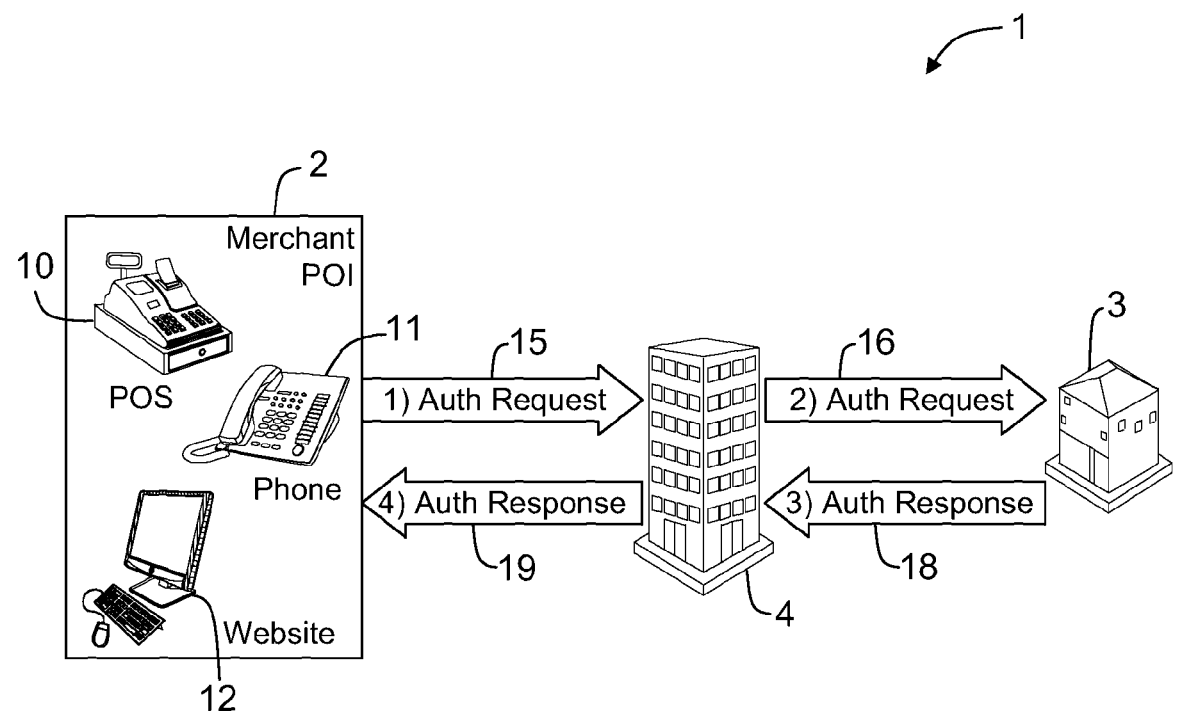
FIG. 1 is a schematic diagram of an exemplary private label card account payment environment.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The systems and processes described herein are sometimes referred to the Private Label Merchant Processing System ("PLMPS"). The PLMPS is directed to managing merchant identification in a cardholder-initiated financial transaction with a private label merchant controlled input device in communication with a third-party payment card network (also referred to as an interchange network) and a database, wherein the cardholder uses a private label payment card issued to the cardholder by a private label issuer bank. The systems and processes include transmitting a list of private label participating merchants from the private label issuer banks to the third-party payment card network for storage in the database, wherein the list includes unique merchant location identifiers to ensure that private label transactions that are submitted to the third-party payment card network for authorization can be validated as originating at a participating merchant location. In the example systems and processes, every private label transaction that is submitted for authorization is compared to the list of merchants to validate that the merchant submitting the transaction is a participating merchant location. The comparison is performed at the third-party payment card network. Transactions that originate at a participating merchant location are submitted to the private label issuer for authorization, and those that originate at a non-participating merchant location are declined.

Correctly identifying that a financial transaction submitted for private label processing has originated with a valid merchant is important for facilitating third-party processing of the transactions. In the case of a proprietary card, also known as a private label card, the processing system described herein ensures that only participating merchant's transactions are authorized as private label. The processing system is able to determine if a private label transaction originated with an appropriate merchant and decline authorization requests when a private label card is used at a non-participating merchant location.

The PLMPS leverages an existing third-party payment system infrastructure (i.e., interchange network) to provide efficient authorization, clearing, and settlement services for private label card transactions. The third-party payment system has extensive network reach, acceptance, and standardized formats that provide issuers with a robust network processing solution for private label card transactions, thereby eliminating the infrastructure limitations of a closed-loop processing model.

However, enabling issuers to switch their private label program transactions through the PLMPS network presents unique challenges to members of the four-party payment system (i.e., issuing bank, interchange network, acquirer or acquiring bank, and merchant). The PLMPS allows for Bank Identification Numbers (BIN) to be approved for usage in an issuer's private label program. The ability to use BINs introduces a level of risk that is not present in existing closed-loop private label processing systems. Merchants are typically directly connected to the issuers that manage their private label programs and transactions are processed in a closed-loop manner. In their current private label processing environment, issuers know that the transactions they receive come from a participating merchant. Accordingly, there is very little risk associated with whether the transaction has come from a participating merchant.

In contrast, using a four-party payment system such as PLMPS to process private label program transactions creates a risk to issuers that a cardholder may use his private label card at a non-participating merchant location. Issuers are no longer directly connected to their participating merchants and instead are utilizing a third-party network (e.g., MasterCard®) to route them their private label transactions. If an issuer authorizes a private label transaction that occurred at a non-participating merchant location because they were not able to verify that the merchant was a program partner, the issuer is responsible for that transaction. In many cases, issuers are not willing to accept this level of risk. The PLMPS ensures that a private label transaction submitted for authorization through the four-party payment system originates from a participating merchant location.

As described below, the PLMPS facilitates an issuer's efforts to validate that a transaction was received from a participating merchant. The PLMPS achieves this technical effect by: 1) storing a list of private label participating merchants provided by private label issuers in a database that is maintained by the third-party payment card network (e.g., MasterCard®); 2) the list includes unique merchant location identifiers to ensure that private label transactions that are submitted to the third-party card network for authorization can be validated as originating at a participating merchant location; 3) comparing every private label transaction that is submitted for authorization to this list of merchants to validate that the merchant submitting the transaction is a participating merchant location; and 4) submitting transactions that originate at a participating merchant location to the private label issuer for authorization, and those that originate at a non-participating merchant location will be declined.

In one embodiment described herein, the private label payment card is associated with a single merchant partner. The single merchant partner may be a single business entity having multiple points of sale or multiple locations. The private label payment card is then configured to allow the cardholder to initiate private label transactions at any of the points of sale of the single merchant partner, and submit the transaction over a third-party interchange network for processing. In another embodiment described herein, the private label payment card is associated with a coalition of merchant partners. The coalition of merchant partners includes a plurality of merchant partners wherein each merchant partner is a separate business entity. Each of these separate merchant partners may have multiple point of sale or multiple locations. The private label payment card is then configured to allow the cardholder to initiate private label transactions at any of the coalition merchant partners, and submit the transaction over a third-party interchange network for processing.

FIG. 1 is a schematic diagram of an exemplary private label card account payment environment 1 that includes a point of interaction 2 controlled by a private label merchant, a card issuer or issuing bank 3, and a transaction processor 4 interconnecting point of interaction 2 and card issuer 3. The merchant's point of interaction 2 generally includes one or more of a point of sale device 10, a telephone 11, and/or a merchant website 12, through which authorization requests are initiated.

More specifically, a merchant authorization request 15 is generated at the merchant's point of interaction 2 which is sent to the transaction processor 4 and forwarded to the card issuer 3 as a request for authorization 16. Upon verifying a status of the cardholder account, the card issuer 3 responds to the transaction processor 4 with an authorization response 18 which is received by the transaction processor 4 and forwarded to the merchant's point of interaction 2 as an authorization response to merchant 19.

In regard to the card account payment environment 1, a cardholder's account number is entered into the merchant's environment with which the cardholder is doing business, in order to obtain the authorization. As described above, this conventionally includes one or more of the cardholder giving his card to a merchant to swipe or key into the merchant point of sale device 10, the cardholder or merchant initiating a phone call from telephone 11 to enter a card account number, the cardholder himself swiping his card in the merchant's point of sale device 10, or the merchant or cardholder entering the account number associated with the financial transaction card into the merchant's website 12. Payments for approved transactions are managed with the card issuer 3 or merchant's acquirer (not shown in FIG. 1) based on the specific card payment network or other closed loop environment. In the exemplary embodiment, private label card account payment environment 1 generally includes point of interaction 2, card issuer 3, and transaction processor 4 in a closed communication network such that authorization requests 15 and 16 remain within private label card account payment environment 1 and authorization responses 18 and 19 also remain within private label card account payment environment 1.

Figure 2:
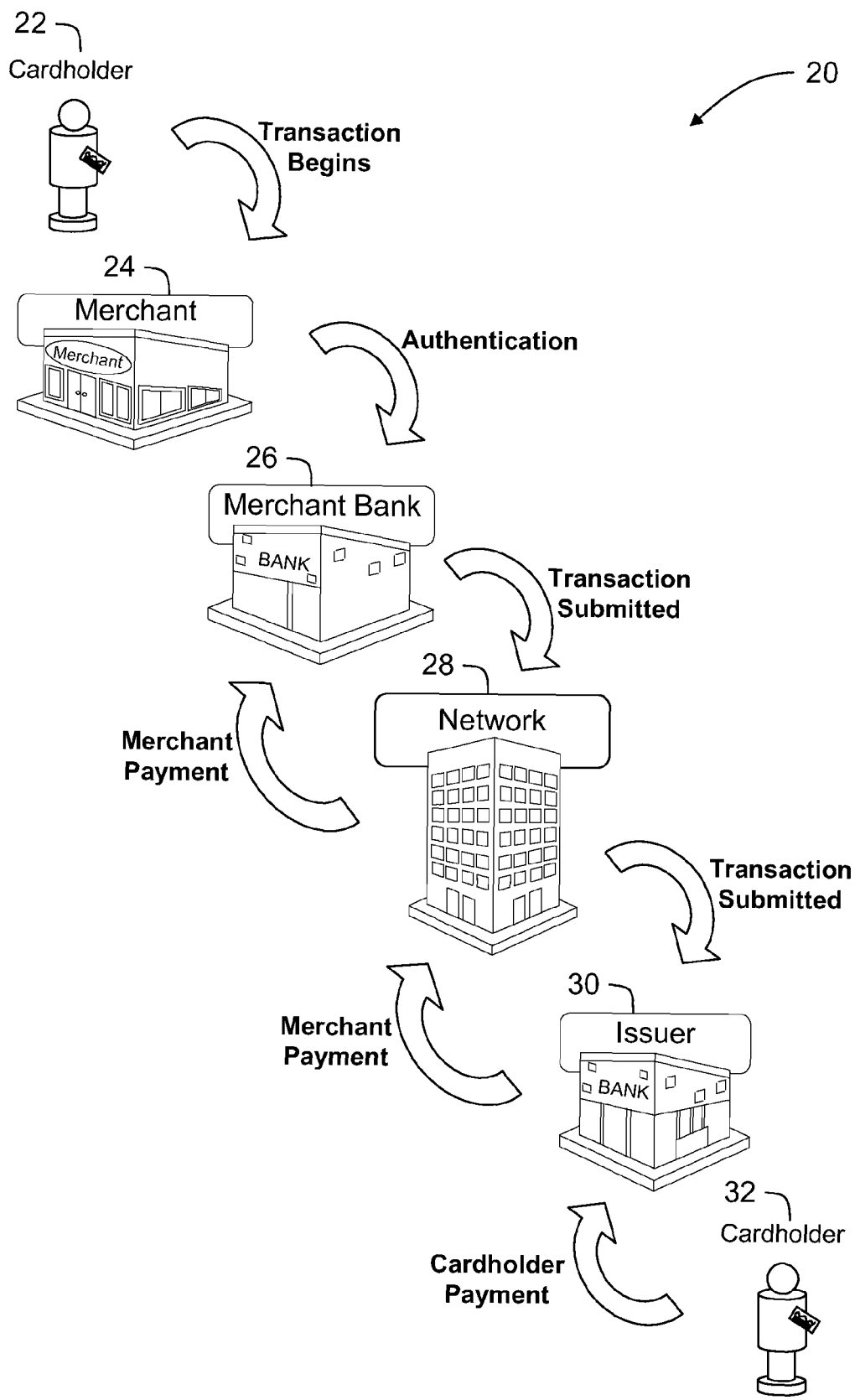
FIG. 2 is a schematic diagram illustrating an exemplary multi-party payment card industry system for enabling ordinary payment-by-card transactions in which merchants and card issuers do not necessarily have a one-to-one relationship.

FIG. 2 is a schematic diagram 20 illustrating an exemplary multi-party payment card industry system for enabling ordinary payment-by-card transactions in which merchants and card issuers do not necessarily have a one-to-one relationship. The present invention relates to a payment card system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account 32 is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which are settled as a group.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 3:
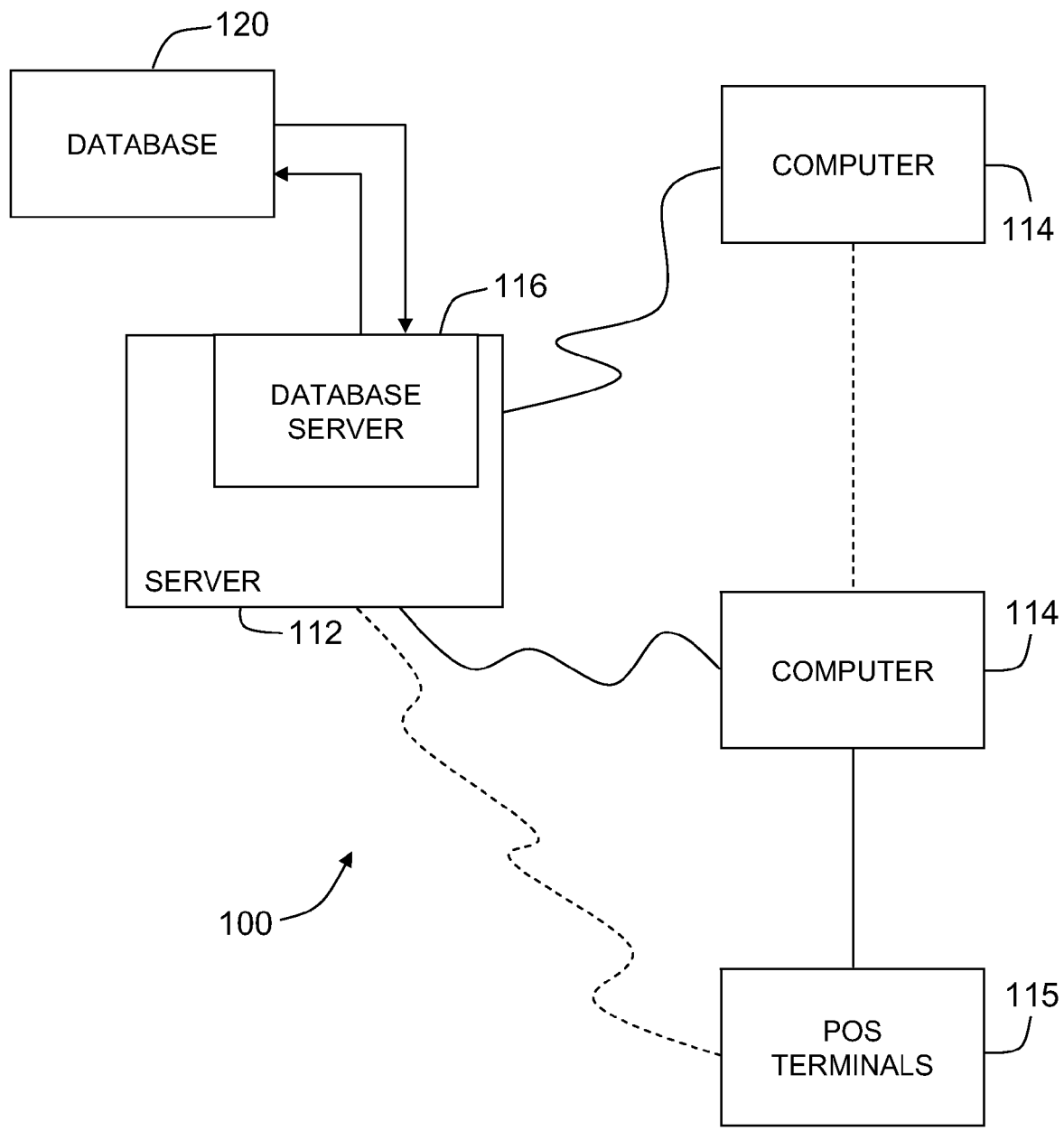
FIG. 3 is a simplified block diagram of an exemplary system in accordance with one embodiment of the present invention.

FIG. 3 is a simplified block diagram of an exemplary system 100 in accordance with one embodiment of the present invention. System 100 is a payment card system, which can be utilized by account holders as part of a process of initiating an authorization request and transaction as described below. More specifically, system 100 is a payment card system sometimes referred to as a Private Label Merchant Processing System ("PLMPS"). System 100 is configured to manage merchant identification in a cardholder-initiated financial transaction with a private label merchant, wherein the cardholder uses a private label payment card issued to the cardholder by a private label issuer bank.

In the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment.

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems and special high-speed ISDN lines. POS terminals 115 could be any device capable of interconnecting to the Internet and includes an input device capable or reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store transaction data generated as part of sales activities conducted over the bankcard network including data relating to merchants, account holders or customers, and purchases. Database 120 may also store data relating to a list of merchants participating in private label programs with the interchange network; account data including data representing a plurality of accounts registered with the network interchange wherein the plurality of accounts include private label accounts and non private label accounts, each of the plurality of accounts having a cardholder, a payment card and an account number associated therewith, the account data further including a private label identifier associated with each payment card designated as a private label payment card; interchange rate data for different types of transactions performed over the interchange network; and rewards program data for different rewards programs offered by the issuer or the interchange network.

In the example embodiment, one of client systems 114 may be associated with an acquirer while another one of client systems 114 may be associated with an issuer, POS terminal 115 may be associated with a participating merchant, and server system 112 may be associated with the interchange network.

Figure 4:
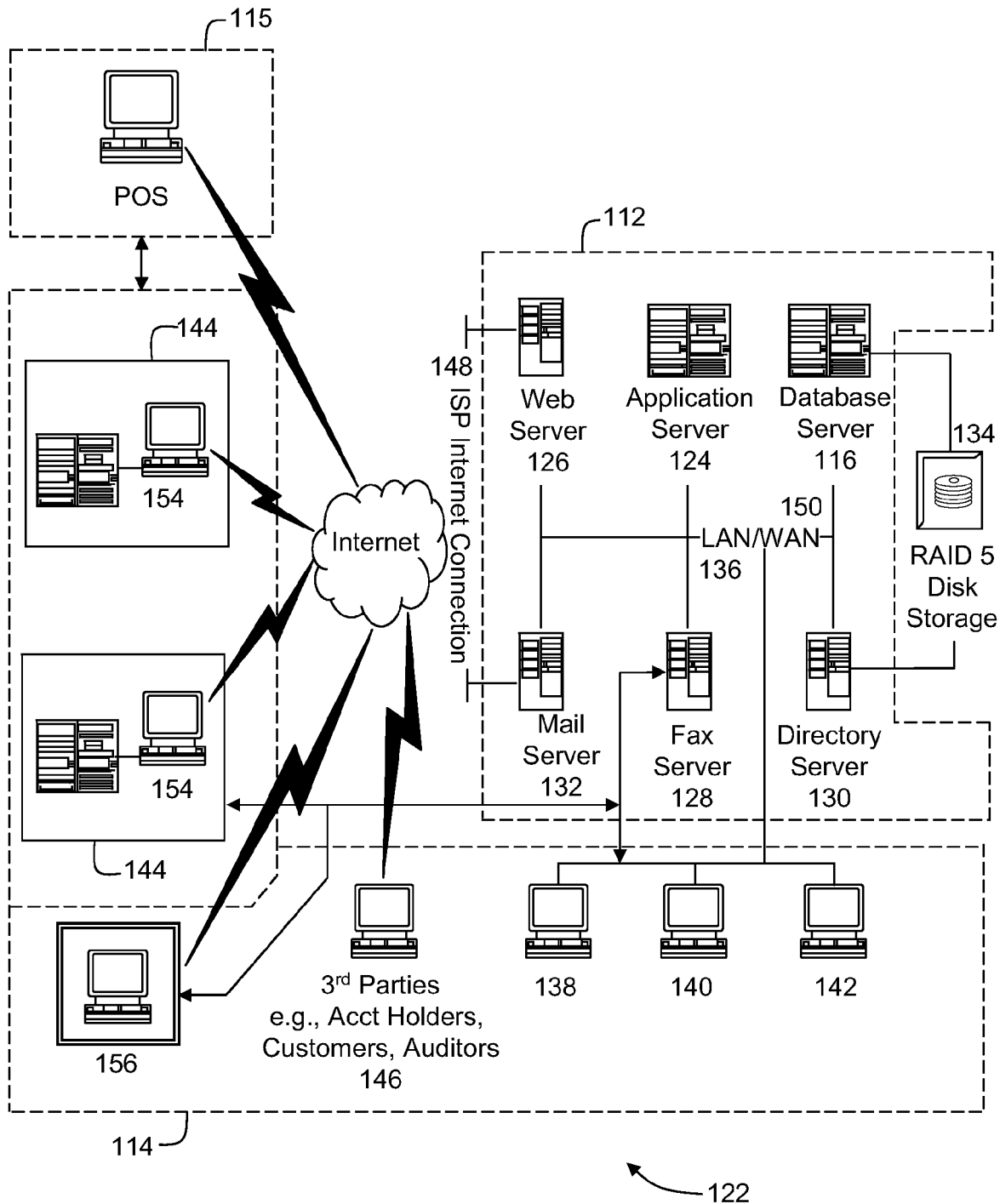
FIG. 4 is an expanded block diagram of an exemplary embodiment of a server architecture of a system in accordance with one embodiment of the present invention.

FIG. 4 is an expanded block diagram of an exemplary embodiment of a server architecture of a system 122 in accordance with one embodiment of the present invention. Components in system 122, identical to components of system 100 (shown in FIG. 3), are identified in FIG. 4 using the same reference numerals as used in FIG. 3. System 122 includes server system 112, client systems 114, and POS terminals 115. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

As used herein, the terms "software" and "firmware" are interchangeable, and include any computer program stored in memory for execution by personal computers, workstations, clients and servers, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 5:
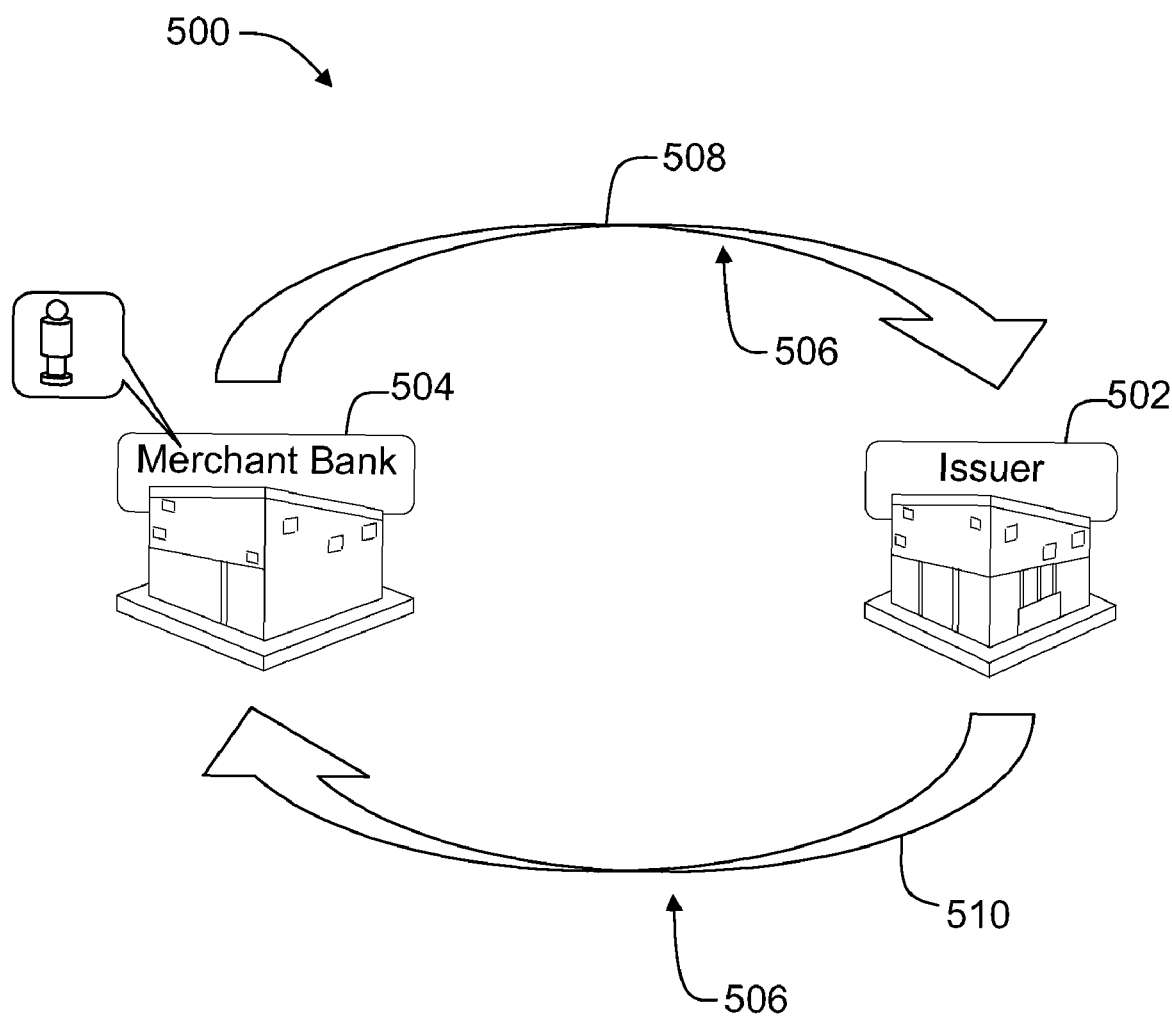
FIG. 5 is a high-level flow diagram of a known private label process using a closed-loop system.

FIG. 5 is a high-level network configuration of a private label payment card system 500 using a closed-loop system. Closed loop, private label payment card system 500 includes one or more issuer financial institutions 502 that issue a payment card, such as a credit card, to a consumer, who uses the payment card to tender payment for a purchase from a plurality of merchants 504.

In closed loop, private label payment card system 500, issuers 502 are directly connected to their partner merchants 504 to process private label transactions using a proprietary network 506. In private label payment card system 500, the private label transactions received by issuers 502 must originate at the known locations of participating partner merchants 504. For example, an authorization request 508 must be initiated from a partner merchant 504 because partner merchants 504 are the only merchants permitted to be connected to private label network 506. Issuers 502 transmit authorization responses 510 to merchants 504 using private label network 506.

Figure 6:
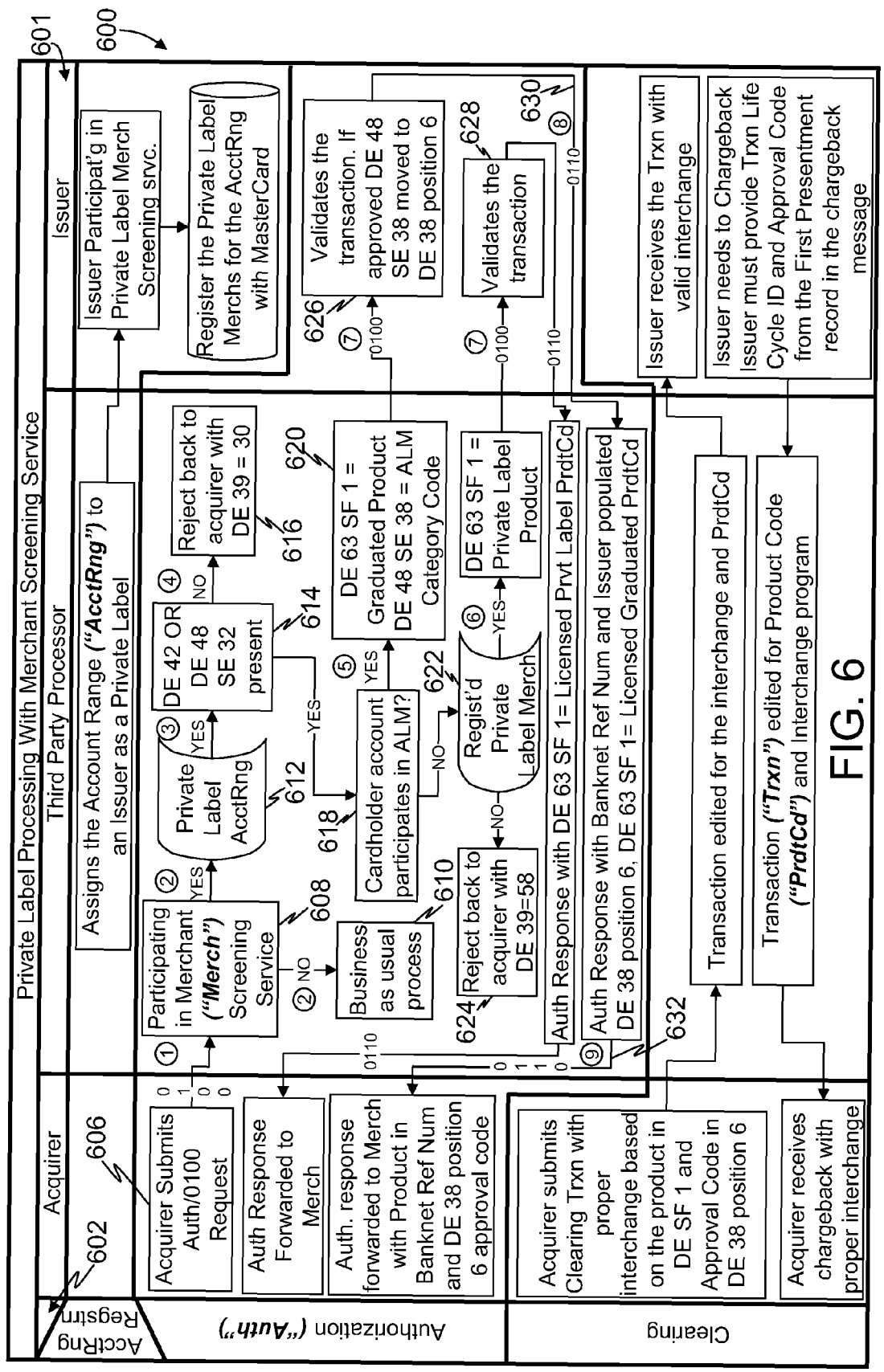
FIG. 6 is a high-level business flow diagram of a private label process in accordance with an embodiment of the present invention.

FIG. 6 is a flow diagram 600 of a private label process in accordance with an embodiment of the present invention. System 100 (shown in FIG. 3) manages merchant identification in a cardholder-initiated financial transaction with a private label merchant, wherein the cardholder uses a private label payment card issued to the cardholder by a private label issuer bank. System 100 receives and stores a list of private label participating merchants from private label issuer banks, wherein the list includes unique merchant location identifiers to ensure that private label transactions that are submitted to system 100 for authorization can be validated as originating at a participating merchant location. For every private label transaction that is submitted for authorization, system 100 compares the transaction information to the list of merchants to validate that the merchant submitting the transaction is a participating merchant location. Transactions that originate at a participating merchant location are submitted to the private label issuer for authorization, and those that originate at a non-participating merchant location are declined.

Correctly identifying that a financial transaction submitted for private label processing has originated with a valid merchant is important for facilitating third party processing of the transactions. In the case of a proprietary card, system 100 ensures that only participating merchant's transactions are authorized as private label. System 100 is able to determine if a private label transaction originated with an appropriate merchant and decline authorization requests when a private label card is used at a non-participating merchant location.

Enabling issuers to switch their private label program transactions through a third-party network presents unique challenges. In a typical private label process, merchants are typically directly connected to the issuers that manage their private label programs and transactions are processed in a closed-loop manner. In the typical private label processing environment, issuers know that the transactions they receive come from a participating merchant because of the closed-loop nature of the environment. However, with a third-party processing private label transactions through the third-party network via the four-party model, issuers would no longer be sure that a private label transaction is coming from a participating merchant location without embodiments of the present invention to provide verification of the merchant identity. Embodiments of the present invention permit third-party BINs to be approved for usage in an issuer's private label program. The ability to use third-party BINs introduces a level of risk that is not present in closed-loop systems. There is now a risk to issuers that a cardholder may use their private label card at a non-participating merchant location. If an issuer authorizes a private label transaction that occurred at an incorrect merchant location because they were not able to verify that the merchant was a program partner, the issuer is responsible for that transaction. Issuers are not willing to accept this level of risk and have asked third party processors to ensure that a private label transaction submitted for authorization originates from a participating merchant location.

The private label process described in FIG. 6 determines if a financial transaction involves private label merchant validation and if an issuer has chosen to use a third-party processor to provide the merchant screening service, and then ensures that the transaction is coming from a valid merchant or else declines authorization requests.

In the exemplary embodiment, private label merchant screening is an optional service available to issuers for their private label programs. The PLMPS evaluates each authorization request (0100) message to determine whether the account participates in the private label merchant screening service. If the account participates in the private label merchant screening program, the authorization system validates whether the transaction occurred at a participating merchant location.

Diagram 600 includes an activity column 602 divided into a plurality of activities that are included in the private label processing including account range registration, authorization and clearing. A header row 604 divides the activities by a party responsible for performing the activity including acquirer, third-party processor (i.e., interchange network), and issuer. As illustrated in FIG. 6, an acquirer submits 606 an authorization request (0100) message to the authorization system. The authorization system determines 608 if the account range associated with the cardholder account participates in the private label merchant screening program. If the account range does not participate in the private label merchant screening program, the authorization system forwards 610 the message to the issuer for approval as business-as-usual. If the account range participates in the private label merchant screening program, the authorization system determines 612 if the account range is set up as private label. The authorization system determines 614 the presence of the card acceptor ID or a third party processor assigned ID. At least one of these fields is required to perform the merchant screening service. If both the card acceptor ID and the third party processor assigned ID are not present, the authorization system rejects 616 the transaction and sends the acquirer an authorization request response (0110) message format error.

The authorization system determines 618 if the cardholder account participates in account level management. If yes, the authorization system populates a financial network code and third party processor assigned ID according to account level management processing. If the cardholder account does not participate in account level management, the authorization system validates 622 the merchant in a card acceptor ID code or third party processor assigned ID to ensure that transaction took place at a participating private label merchant location. If the participating private label merchant is validated against the merchant registration database, the authorization system populates the private label product code and forwards the authorization request message to the issuer for approval. If the participating merchant cannot be validated, the authorization system rejects the transaction and sends 624 the acquirer an authorization request response message with a response code indicating the transaction is not permitted to acquirer/terminal. The issuer then validates 626 the transaction. If the authorization ID response contains a value B, M, P, or Z, the issuer confirms the account for account level management, otherwise, processes 628 it as business-as-usual. The issuer transmits 630 the transaction to the authorization system with the response code. If the transaction is approved as account level management, the issuer copies and/or moves the value in the third party processor assigned ID to the authorization ID response. If the transaction qualifies as business-as-usual, the issuer sends the appropriate response in a response code. The authorization system forwards 632 the authorization request response (0110) message to the acquirer containing the licensed product code and authorization ID response containing the value, if present. If the account category value was present in the authorization request (0100) message, the issuer places the value in authorization ID response approval code.

Figure 7:
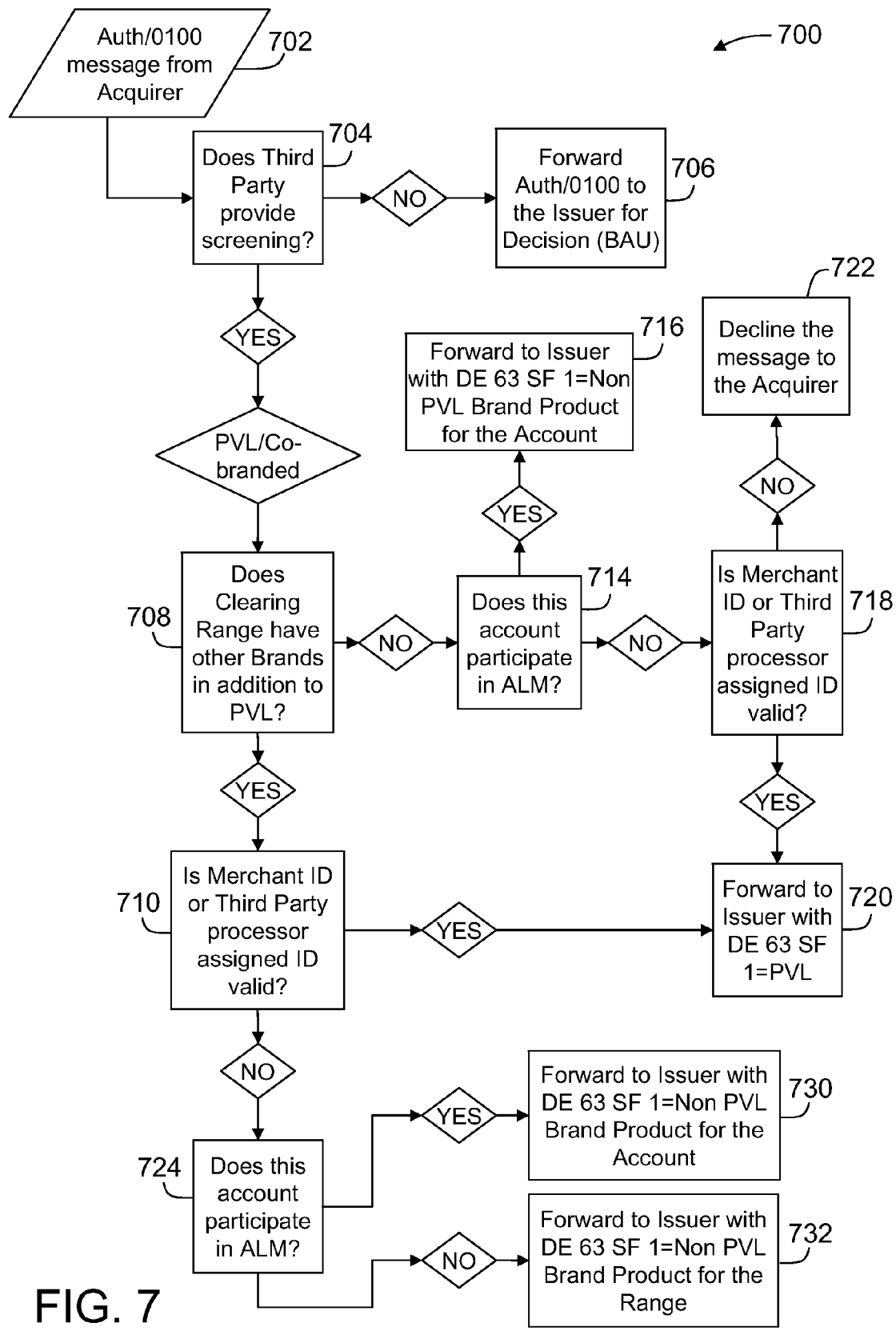
FIG. 7 is a flow diagram illustrating an exemplary process for determining if a merchant is a valid participating merchant for private label processing in accordance with the present invention.

FIG. 7 is a flow diagram 700 illustrating an exemplary process for determining if a merchant is a valid participating merchant for private label processing in accordance with the present invention. In the exemplary embodiment, system 100 (shown in FIG. 3) receives 702 a new authorization (0100) message from an acquirer. The authorization system 100 checks 704 the newly received authorization (0100) message to determine if the third party processor will be performing the merchant screening service or not. More specifically, authorization system checks a service code at an authorization account range processing service when an authorization request is submitted to the third party processor to determine if the third party processor will be performing the merchant screening service or not. The merchant screening is performed only on authorization (0100) messages.

If the third party processor does not provide the merchant screening service for this particular merchant, account, issuer and/or transaction, then the system forwards 706 the received authorization (0100) message to the issuer for approval as business-as-usual. If the third party processor provides the merchant screening service, then the clearing issuer account range brand product extract is checked 708 to determine if the range is co-branded (this can be identified by a clearing range associated to other brands in addition to private label) or not. If authorization (0100) message contains both the third party processor assigned ID and merchant ID, then merchant ID takes precedence over the third party processor assigned ID.

If the clearing range only has brand product for private label acceptance brand (CPI) associated or range has private label and CIR acceptance brand, and co-brand indicator is not set then, (a) If it is an automated teller machine (ATM) transaction, forward 710 to the issuer using brand product CIR, else reject the transaction with a response code of "transaction not permitted to acquirer/terminal"; (b) If it is not an ATM transaction, then determine 714 if account participates in account level management (ALM). If the account participates in ALM, then populate 716 the account category with "M" or "P" as per current ALM logic and private label merchant code will contain the graduated product; (c) If the account does not participate in ALM and is not an ATM transaction then validate 718 the third party processor assigned ID or merchant ID in merchant screening table.

If merchant ID in the card acceptor ID combination or third party processor assigned ID in third party processor assigned ID finds a match for the account, the system forwards 720 to the issuer using brand product for the private label acceptance brand in private label merchant code field.

If the merchant ID in the acquirer-assigned card acceptor ID, combination and third party processor assigned ID in the third party processor assigned ID field for the account does not match and processing code is not 01, then the system declines 722 the transaction back to acquirer with "format error" response code of "Transaction not permitted to acquirer/terminal".

If it is an ATM transaction, forward to the issuer using brand product, else reject the transaction with a response code of "transaction not permitted to acquirer/terminal". The account category will contain "P". Forward the transaction to the issuer for authorization.

If it is not an ATM transaction, look at the card acceptor ID merchant ID, or third party processor assigned ID in for the account to find a match on the table. If match is found, then populate PVL in the private label merchant code field. The account category will contain "P". Forward 720 the transaction to the issuer for authorization.

If it is not an ATM transaction and merchant ID or third party processor assigned ID for the account does not find a match, then determine 724 if account participates in account level management (ALM). If the account participates in ALM, assign the graduated product code in the private label merchant code field. The account category will contain "P" or "M" as per current ALM logic. Forward 730 the transaction to the issuer for authorization.

If it is not an ATM transaction and match on merchant ID or third party processor assigned ID is not found and account does not participate in product graduation, assign the non PVL, non CIR (Clearing Issuer Account Range) product code according to the brand priority in the financial network code. The account category will contain "P". Forward 732 the transaction to the issuer for authorization.

Figure 8:
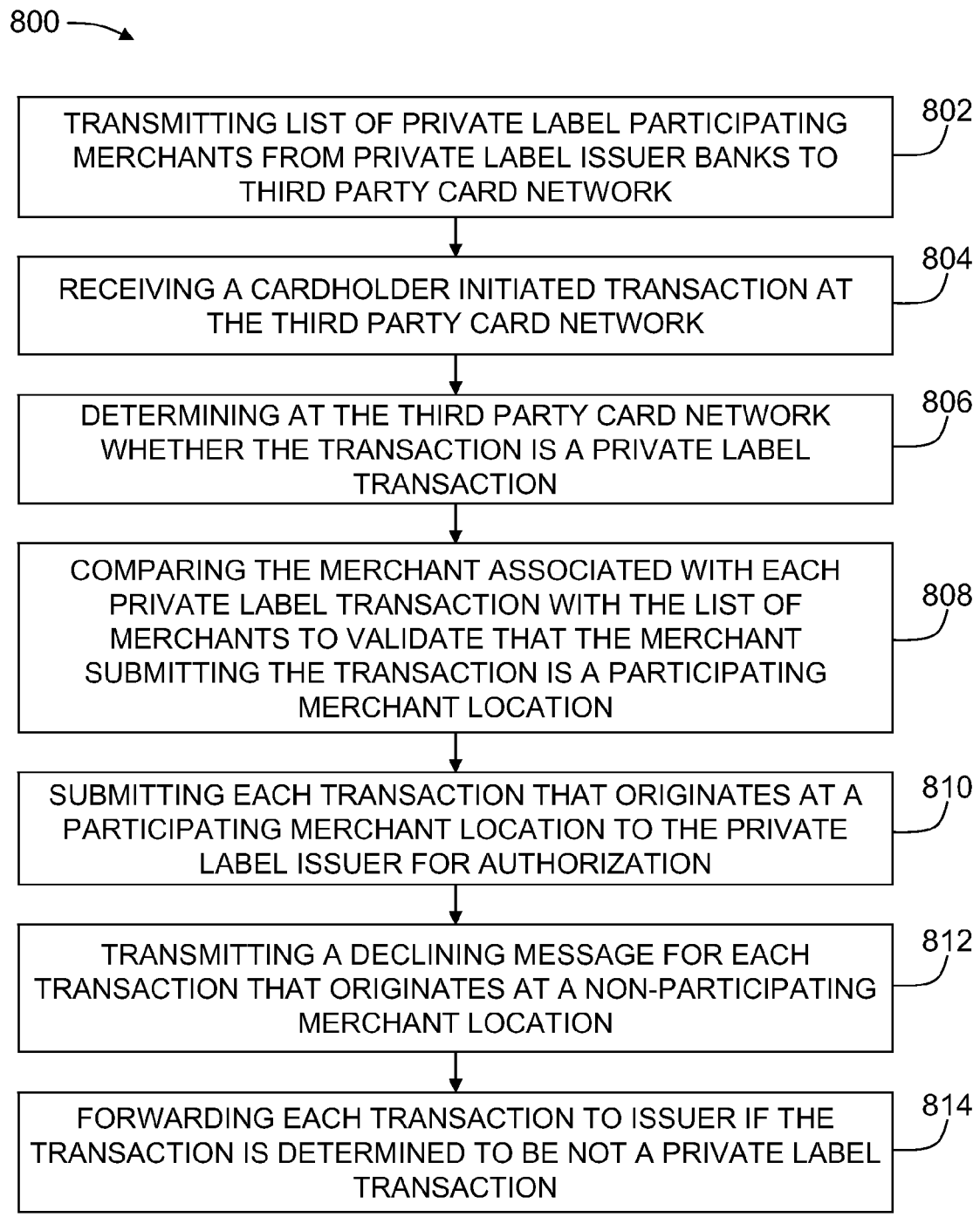
FIG. 8 is a flow diagram illustrating an exemplary process for managing merchant identification in a cardholder-initiated financial transaction with a private label merchant in accordance with the present invention.

FIG. 8 is a flow chart 800 illustrating an exemplary process for managing merchant identification in a cardholder-initiated financial transaction with a private label merchant using a private label merchant controlled input device in communication with a third-party card network and a database.

The technical effect of the systems and processes described herein is achieved by transmitting 802 a list of private label participating merchants from private label issuer banks to the third-party card network for storage in the database wherein the list includes unique merchant location identifiers to ensure that private label transactions that are submitted to the third-party card network for authorization can be validated as originating at a participating merchant location, receiving 804 a cardholder-initiated transaction at the third-party card network, determining 806 at the third-party card network whether the transaction is a private label transaction, comparing 808 the merchant associated with each private label transaction with the list of merchants to validate that the merchant submitting the transaction is a participating merchant location, submitting 810 each transaction that originates at a participating merchant location to the private label issuer for authorization, and transmitting 812 a declining message for each transaction that originates at a non-participating merchant location. If the system determines that the transaction is not a private label transaction, then the system forwards 814 to the issuer the transaction data for processing as business-as-usual.

More specifically, the systems and processes described herein facilitate processing a financial transaction using a payment card through a third-party interchange network. The financial transaction is initiated by a cardholder at a merchant location. The payment card is issued by an issuer to the cardholders The process includes storing within a database a list of private label participating merchants including a merchant location identifier identifying each location of each private label participating merchant included on the list, receiving at the interchange network an authorization request for the transaction involving the payment card wherein the authorization request includes a data field for storing a merchant location identifier for the merchant location where the transaction occurred, performing a merchant screening process on the transaction including validating the transaction as originating at a private label participating merchant location by comparing the received merchant location identifier to the list of private label participating merchants stored within the database, manipulating at the interchange network the authorization request to include a private label identifier when the transaction is determined to have originated at one of the participating merchants, and transmitting the manipulated authorization request with the private label identifier to the issuer for processing as a private label transaction.

In addition, account data may be stored within the database. The account data includes each account number registered with the interchange network for receiving the merchant screening process. Thus, in the example embodiment, the step of storing account data within the database includes assigning a range of account numbers to the issuer by the interchange network wherein the range of account numbers is designated for receiving the merchant screening process, associating an account number from the range of account numbers with the payment card, storing the range of account numbers in the database, receiving the authorization request including the account number associated with the payment card used in the transaction, and applying the merchant screening process to the transaction based on the received account number including determining whether the account number associated with the payment card is registered as a private label account number. If the account number is registered as a private label account number, then the process includes determining whether the transaction originated at a private label participating merchant location before transmitting the authorization request to the issuer as a private label transaction. If, however, the account number is not registered as a private label account number, then the process includes transmitting the authorization request to the issuer as a business-as-usual transaction.

In the example embodiment, the step of performing a merchant screening process includes determining that the payment card is associated with a private label account, determining whether the authorization request includes at least one of a card acceptor identifier and a third-party processor identifier, and denying the authorization request if the authorization request does not include the at lease one of the card acceptor identifier and the third-party processor identifier. If, however, the system determines that the authorization request includes at least one of a card acceptor identifier and a third-party processor identifier, then the system validates the transaction as originating at a private label participating merchant location by comparing the received merchant location identifier (a card acceptor identifier and/or a third-party processor identifier) to the list of private label participating merchants stored within the database.

In the example embodiment, the step of manipulating at the interchange network the authorization request includes populating a product code data field included within the authorization request with the private label identifier after determining the transaction originated at one of the participating merchants.

The example process further includes receiving at the interchange network an authorization response generated by the issuer. The authorization response includes the private label identifier and approval data. The approval data includes a confirmation from the issuer that the cardholder has sufficient funds to settle the transaction. The merchant is in communication with the acquirer, and the acquirer is in communication with the interchange network. The process further includes transmitting the authorization response with the private label identifier from the interchange network to the acquirer, wherein the authorization response is further transmitted to the participating merchant to approve the transaction. The authorization response instructs the acquirer to designate the transaction as a private label transaction.

The process also includes receiving settlement data from the acquirer corresponding to the transaction. The settlement data includes the private label identifier for identifying the settlement data for processing as a private label transaction. The settlement data represents monetary funds being transferred between the issuer, the acquirer and the participating merchant for completing the transaction. The process therefore further includes determining at the interchange network that the settlement data received from the acquirer is identified as being associated with a private label transaction, determining a private label interchange rate for the private label transaction, and processing the private label transaction at the interchange network at the private label interchange rate.

The above-described embodiments of a method and system of identifying valid private label transactions provides a cost-effective and reliable means for a third party card network to identify participating merchants in a private label transaction system, and notify the associated issuer as to whether the identified merchants is a participating merchant or not.

As will be appreciated based on the foregoing specification, the above-described embodiments of the disclosure may be implemented using computer programming or engineering techniques including computer software, firmware, hardware or any combination or subset thereof, wherein the technical effect of the systems and processes described herein is achieved by creating an application to identify participating merchants in a private label transaction system, and notify the associated issuer as to whether the identified merchants is a participating merchant or not.

The processes and systems described herein may be implemented using a computer that is controlled by instructions embodied on a computer readable medium. The computer program includes computer-readable code means that is embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-based method for processing a financial transaction using a payment card through a third-party interchange network, the financial transaction initiated by a cardholder at a merchant location, the payment card issued by an issuer to the cardholder, said method comprising:

storing within a computer database a list of private label participating merchants including a merchant location identifier identifying each location of each private label participating merchant included on the list, the computer database in communication with the interchange network;

receiving, at an interchange network computer, an authorization request for the transaction involving the payment card, the authorization request including a data field for storing a merchant location identifier for the merchant location where the transaction occurred;

performing a merchant screening process on the transaction including validating the transaction as originating at a private label participating merchant location by comparing the received merchant location identifier to the list of private label participating merchants stored within the computer database;

manipulating, at the interchange network computer, the authorization request to include a private label identifier when the transaction is determined to have originated at one of the participating merchants; and transmitting the manipulated authorization request with the private label identifier to the issuer for processing as a private label transaction.

2. A computer-based method according to claim 1 wherein storing within a computer database further comprises:

storing account data within the computer database, the account data including each account number registered with the interchange network for receiving the merchant screening process.

3. A computer-based method according to claim 2 wherein receiving, at an interchange network computer, an authorization request further comprises:

receiving the authorization request including the account number associated with the payment card used in the transaction; and determining whether to apply the merchant screening process to the transaction by comparing the received account number to the account numbers stored within the database.

4. A computer-based method according to claim 2 wherein storing account data within the computer database further comprises:

assigning a range of account numbers to the issuer by the interchange network, the range of account numbers designated for receiving the merchant screening process;

associating an account number from the range of account numbers with the payment card;

storing the range of account numbers in the computer database;

receiving the authorization request including the account number associated with the payment card used in the transaction; and applying the merchant screening process to the transaction based on the received account number.

5. A computer-based method according to claim 4 wherein applying the merchant screening process further comprises:
   determining whether the account number associated with the payment card is registered as a private label account number;
   if the account number is registered as a private label account number, then determining whether the transaction originated at a private label participating merchant location before transmitting the authorization request to the issuer as a private label transaction; and
   if the account number is not registered as a private label account number, then transmitting the authorization request to the issuer as a business-as-usual transaction.

6. A computer-based method according to claim 1 wherein performing a merchant screening process further comprises:
   determining that the payment card is associated with a private label account;
   determining whether the authorization request includes at least one of a card acceptor identifier and a third-party processor identifier; and
   denying the authorization request if the authorization request does not include the at lease one of the card acceptor identifier and the third-party processor identifier.

7. A computer-based method according to claim 1 wherein performing a merchant screening process further comprises:
   determining that the payment card is associated with a private label account;
   determining that the authorization request includes a merchant location identifier, the merchant location identifier including at least one of a card acceptor identifier and a third-party processor identifier; and
   validating the transaction as originating at a private label participating merchant location by comparing the received merchant location identifier to the list of private label participating merchants stored within the database.

8. A computer-based method according to claim 1 wherein manipulating, at the interchange network computer, the authorization request further comprises:
   populating a product code data field included within the authorization request with the private label identifier after determining the transaction originated at one of the participating merchants.

9. A computer-based method according to claim 1 further comprising:
   receiving, at the interchange network computer, an authorization response generated by the issuer, the authorization response including the private label identifier and approval data, wherein the approval data includes confirmation from the issuer that the cardholder has sufficient funds to settle the transaction.

10. A computer-based method according to claim 9 wherein the merchant is in communication with an acquirer, and the acquirer is in communication with the interchange network, and wherein the method further comprises:
    transmitting the authorization response with the private label identifier from the interchange network computer to the acquirer, wherein the authorization response is further transmitted to the participating merchant to approve the transaction, and wherein the authorization response instructs the acquirer to designate the transaction as a private label transaction.

11. A computer-based method according to claim 1 wherein the merchant is in communication with an acquirer, and the acquirer is in communication with the interchange network, and wherein the method further comprises:
    receiving settlement data from the acquirer corresponding to the transaction, the settlement data including the private label identifier for identifying the settlement data for processing as a private label transaction, wherein the settlement data represents monetary funds being transferred between the issuer, the acquirer and the participating merchant for completing the transaction.

12. A computer-based method according to claim 11 further comprising:
    determining, at the interchange network computer, that the settlement data received from the acquirer is identified as being associated with a private label transaction;
    determining a private label interchange rate for the private label transaction; and
    processing the private label transaction at the interchange network at the private label interchange rate.

13. A network-based system for processing a financial transaction using a payment card through a third-party interchange network, the financial transaction initiated by a cardholder at a merchant location, the payment card issued by an issuer to the cardholder, said system comprising:
    an acquirer computer system;
    an issuer computer system;
    a database; and
    a server system configured to be coupled to the acquirer computer system, the issuer computer system, and the database, said interchange network server system, said server system configured to:
    store within the database a list of private label participating merchants including a merchant location identifier identifying each location of each private label participating merchant included on the list;
    receive from the acquirer computer system an authorization request for the transaction involving the payment card, the authorization request including a data field for storing a merchant location identifier for the merchant location where the transaction occurred;
    perform a merchant screening process on the transaction including validating the transaction as originating at a private label participating merchant location by comparing the received merchant location identifier to the list of private label participating merchants stored within the database;
    manipulate the authorization request to include a private label identifier when the transaction is determined to have originated at one of the participating merchants; and
    transmit the manipulated authorization request with the private label identifier to the issuer computer system for processing as a private label transaction.

14. A system according to claim 13 wherein said server system is further configured to:
    assign a range of account numbers to the issuer, the range of account numbers designated for receiving the merchant screening process;
    associate an account number from the range of account numbers with the payment card;
    store the range of account numbers in the database;
    receive from the acquirer computer system the authorization request including the account number associated with the payment card used in the transaction; and
    apply the merchant screening process to the transaction based on the received account number.

15. A system according to claim 14 wherein said server system is further configured to:

determine whether the account number associated with the payment card is registered as a private label account number;

determine that the transaction originated at a private label participating merchant location before transmitting the authorization request to the issuer computer system as a private label transaction when the account number is registered as a private label account number; and transmit the authorization request to the issuer computer system as a business-as-usual transaction when the account number is not registered as a private label account number.

16. A system according to claim 13 wherein said server system is further configured to:

determine that the payment card is associated with a private label account;

determine whether the authorization request includes at least one of a card acceptor identifier and a third-party processor identifier;

deny the authorization request if the authorization request does not include the at lease one of the card acceptor identifier and the third-party processor identifier; and transmit a denial message to the acquirer computer system.

17. A system according to claim 13 wherein said server system is further configured to:

determine that the payment card is associated with a private label account;

determine that the authorization request received from the acquirer computer system includes a merchant location identifier, the merchant location identifier including at least one of a card acceptor identifier and a third-party processor identifier; and validate the transaction as originating at a private label participating merchant location by comparing the received merchant location identifier to the list of private label participating merchants stored within the database.

18. A system according to claim 13 wherein said server system is further configured to:

receive an authorization response generated by the issuer computer system, the authorization response including the private label identifier and approval data, wherein the approval data includes confirmation from the issuer that the cardholder has sufficient funds to settle the transaction.

19. A system according to claim 18 wherein said server system is further configured to:

transmit the authorization response with the private label identifier to the acquirer computer system, wherein the authorization response is further transmitted to the participating merchant to approve the transaction, and wherein the authorization response instructs the acquirer to designate the transaction as a private label transaction.

20. A system according to claim 13 wherein said server system is further configured to:

receive settlement data from the acquirer computer system corresponding to the transaction, the settlement data including the private label identifier for identifying the settlement data for processing as a private label transaction, wherein the settlement data represents monetary funds being transferred between the issuer, the acquirer and the participating merchant for completing the transaction.

21. A system according to claim 20 wherein said server system is further configured to:

determine that the settlement data received from the acquirer computer system is identified as being associated with a private label transaction;

determine a private label interchange rate for the private label transaction; and process the private label transaction at the private label interchange rate.

22. A computer for processing a financial transaction initiated by a cardholder at a merchant location using a payment card, the third-party interchange network computer, the payment card issued by an issuer to a cardholder, said computer having a memory, said computer programmed to:

store within the memory a list of private label participating merchants including a merchant location identifier identifying each location of each private label participating merchant included on the list;

receive an authorization request for the transaction involving the payment card, the authorization request including a data field for storing a merchant location identifier for the merchant location where the transaction occurred;

perform a merchant screening process on the transaction including validating the transaction as originating at a private label participating merchant location by comparing the received merchant location identifier to the list of private label participating merchants stored within the memory;

manipulate the authorization request to include a private label identifier when the transaction is determined to have originated at one of the participating merchants; and transmit the manipulated authorization request with the private label identifier to the issuer for processing as a private label transaction.

23. A computer according to claim 22 wherein said computer is programmed to:

store account data within the memory, the account data including each account number registered with the interchange network for receiving the merchant screening process.

24. A computer according to claim 23 wherein said computer is programmed to:

receive the authorization request including the account number associated with the payment card used in the transaction; and determine whether to apply the merchant screening process to the transaction by comparing the received account number to the account numbers stored within the memory.

25. A computer according to claim 23 wherein said computer is programmed to:

assign a range of account numbers to the issuer, the range of account numbers designated for receiving the merchant screening process;

associate an account number from the range of account numbers with the payment card;

store the range of account numbers in the memory;

receive the authorization request including the account number associated with the payment card used in the transaction; and apply the merchant screening process to the transaction based on the received account number.

26. A computer according to claim 25 wherein said computer is programmed to:

determine whether the account number associated with the payment card is registered as a private label account number;

if the account number is registered as a private label account number, determine whether the transaction originated at a private label participating merchant location before transmitting the authorization request to the issuer as a private label transaction; and if the account number is not registered as a private label account number, transmit the authorization request to the issuer as a business-as-usual transaction.

27. A computer according to claim 22 wherein said computer is programmed to:
   determine that the payment card is associated with a private label account;
   determine whether the authorization request includes at least one of a card acceptor identifier and a third-party processor identifier; and
   deny the authorization request if the authorization request does not include the at lease one of the card acceptor identifier and the third-party processor identifier.

28. A computer according to claim 22 wherein said computer is programmed to:
   determine that the payment card is associated with a private label account;
   determine that the authorization request includes a merchant location identifier, the merchant location identifier including at least one of a card acceptor identifier and a third-party processor identifier; and
   validate the transaction as originating at a private label participating merchant location by comparing the received merchant location identifier to the list of private label participating merchants stored within the memory.

29. A computer according to claim 22 wherein said computer is programmed to:
   populate a product code data field included within the authorization request with the private label identifier after determining the transaction originated at one of the participating merchants.

30. A computer according to claim 22 wherein said computer is programmed to:
   receive an authorization response generated by the issuer, the authorization response including the private label identifier and approval data, wherein the approval data includes confirmation from the issuer that the cardholder has sufficient funds to settle the transaction.

31. A computer according to claim 30 wherein the merchant is in communication with an acquirer, and the acquirer is in communication with said computer, and said computer is programmed to:
   transmit the authorization response with the private label identifier to the acquirer, wherein the authorization response is further transmitted to the participating merchant to approve the transaction, and wherein the authorization response instructs the acquirer to designate the transaction as a private label transaction.

32. A computer according to claim 22 wherein the merchant is in communication with an acquirer, and the acquirer is in communication with said computer, and said computer is programmed to:
   receive settlement data from the acquirer corresponding to the transaction, the settlement data including the private label identifier for identifying the settlement data for processing as a private label transaction, wherein the settlement data represents monetary funds being transferred between the issuer, the acquirer and the participating merchant for completing the transaction.

33. A computer according to claim 32 wherein said computer is programmed to:
   determine that the settlement data received from the acquirer is identified as being associated with a private label transaction;
   determine a private label interchange rate for the private label transaction; and
   process the private label transaction at the private label interchange rate.

34. A computer program embodied on a non-transitory computer readable medium for processing a financial transaction using a payment card and a third-party interchange network computer, the financial transaction initiated by a cardholder at a merchant location, the payment card issued by an issuer to the cardholder, said program is executed by the interchange network computer and comprises at least one code segment that:
   stores within a database a list of private label participating merchants including a merchant location identifier identifying each location of each private label participating merchant included on the list;
   receives an authorization request for the transaction involving the payment card, the authorization request including a data field for storing a merchant location identifier for the merchant location where the transaction occurred;
   performs a merchant screening process on the transaction including validating the transaction as originating at a private label participating merchant location by comparing the received merchant location identifier to the list of private label participating merchants stored within the database;
   manipulates the authorization request to include a private label identifier when the transaction is determined to have originated at one of the participating merchants; and
   transmits the manipulated authorization request with the private label identifier to the issuer for processing as a private label transaction.

35. A computer program according to claim 34 further comprising at least one code segment that:
   assigns a range of account numbers to the issuer, the range of account numbers designated for receiving the merchant screening process;
   associates an account number from the range of account numbers with the payment card;
   stores the range of account numbers in the database;
   receives the authorization request including the account number associated with the payment card used in the transaction;
   applies the merchant screening process to the transaction based on the received account number including determining whether the account number associated with the payment card is registered as a private label account number;
   if the account number is registered as a private label account number, determines whether the transaction originated at a private label participating merchant location before transmitting the authorization request to the issuer as a private label transaction; and
   if the account number is not registered as a private label account number, transmits the authorization request to the issuer as a business-as-usual transaction.

\* \* \* \* \*